US012560926B2

(12) United States Patent
Ju

(10) Patent No.: US 12,560,926 B2
(45) Date of Patent: Feb. 24, 2026

(54) ROBOT AND METHOD FOR CONTROLLING SAME

(71) Applicant: SAMSUNG ELECTRONICS CO., LTD., Suwon-si (KR)

(72) Inventor: Jaeyong Ju, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 261 days.

(21) Appl. No.: 18/109,025

(22) Filed: Feb. 13, 2023

(65) Prior Publication Data

US 2023/0195113 A1 Jun. 22, 2023

Related U.S. Application Data

(63) Continuation of application No. PCT/KR2021/008435, filed on Jul. 2, 2021.

(30) Foreign Application Priority Data

Aug. 14, 2020 (KR) ......................... 10-2020-0102283

(51) Int. Cl.
 G05D 1/00 (2024.01)
 G06T 7/579 (2017.01)
 (Continued)

(52) U.S. Cl.
 CPC ......... G05D 1/0088 (2013.01); G05D 1/0246 (2013.01); G05D 1/0274 (2013.01);
 (Continued)

(58) Field of Classification Search
 CPC ................ B60W 20/10; B60W 10/08; B60W 2510/081; B60W 2510/087;
 (Continued)

(56) References Cited

U.S. PATENT DOCUMENTS 7,742,623 B1 * 6/2010 Moon .................... G06V 40/19
382/103
8,024,072 B2 9/2011 Park et al.
(Continued)

FOREIGN PATENT DOCUMENTS

JP 2003-266349 A 9/2003
JP 2019-84628 A 6/2019
(Continued)

OTHER PUBLICATIONS

E. Chong et al., "Connecting Gaze, Scene, and Attention: Generalized Attention Estimation via Joint Modeling of Gaze and Scene Saliency", arXiv:1807.10437v1 [cs.CV], Jul. 27, 2018, (16 total pages).

(Continued)

*Primary Examiner* — Isaac G Smith
(74) *Attorney, Agent, or Firm* — Sughrue Mion, PLLC

(57) ABSTRACT

A robot and a method for controlling a robot are provided. The method includes: acquiring an image of a user; acquiring, by analyzing the image, a first information regarding a position of the user and a gaze direction of the user; acquiring, based on an image capturing position associated with the image and an image capturing direction associated with the image, matching information for matching the first information with a map corresponding to an environment in which the robot is operated; acquiring, based on the matching information and the first information, second information regarding the position of the user on the map and the gaze direction of the user on the map; and identifying an object corresponding to the gaze direction of the user on the map by inputting the second information into an artificial intelligence model trained to identify an object on the map.

18 Claims, 18 Drawing Sheets

(51) Int. Cl.

| | | |
|---|---|---|
| *G06T 7/70* | (2017.01) | |
| *G06V 10/25* | (2022.01) | |
| *G06V 10/82* | (2022.01) | |
| *G06V 20/64* | (2022.01) | |
| *G06V 40/16* | (2022.01) | |

(52) U.S. Cl.
CPC ............... *G06T 7/579* (2017.01); *G06T 7/70* (2017.01); *G06V 10/25* (2022.01); *G06V 10/82* (2022.01); *G06V 20/64* (2022.01); *G06V 40/161* (2022.01); *G06T 2207/20081* (2013.01); *G06T 2207/20084* (2013.01); *G06T 2207/30201* (2013.01)

(58) Field of Classification Search
CPC ....... B60W 2510/244; B60W 2540/10; B60W 2710/083; B60W 10/02; B60W 10/06; B60W 20/11; B60W 20/16; B60W 20/40; B60W 2510/083; B60W 2510/246; B60W 2520/10; B60W 2540/103; B60W 2555/20; B60W 2710/081; B60W 2710/088; B60W 2710/244; B60W 2710/246; B60K 2006/4825; B60K 6/48; B60K 6/387; Y02T 10/62; G05D 1/0088; G05D 1/0246; G05D 1/0274; G06T 7/579; G06T 7/70; G06T 2207/20081; G06T 2207/20084; G06T 2207/30201; G06V 10/25; G06V 10/82; G06V 20/64; G06V 40/161
USPC ......................................................... 701/23
See application file for complete search history.

(56) References Cited

U.S. PATENT DOCUMENTS

| | | | |
|---|---|---|---|
| 9,245,171 B2 | 1/2016 | Aoki et al. | |
| 10,027,888 B1 | 7/2018 | Mackraz | |
| 10,155,166 B1 | 12/2018 | Taylor et al. | |
| 10,157,313 B1 * | 12/2018 | Zhang .................... | A61B 1/046 |
| 10,628,706 B2 | 4/2020 | Shrestha et al. | |
| 10,671,974 B2 | 6/2020 | Karadayi | |
| 10,936,062 B2 | 3/2021 | Maeng et al. | |
| 10,942,566 B2 | 3/2021 | Jeon et al. | |
| 11,285,611 B2 | 3/2022 | Park et al. | |
| 11,338,429 B2 | 5/2022 | Park et al. | |
| 2013/0346348 A1 * | 12/2013 | Buehler ............... | G05B 19/423 |
| | | | 901/31 |
| 2019/0118091 A1 | 4/2019 | Taylor et al. | |
| 2019/0130184 A1 * | 5/2019 | Samanta ........... | G02B 27/0093 |
| 2019/0213550 A1 * | 7/2019 | Karadayi ............... | H04N 7/142 |
| 2019/0317594 A1 * | 10/2019 | Stent .................... | G05D 1/0221 |
| 2019/0344428 A1 | 11/2019 | Park et al. | |
| 2019/0371002 A1 * | 12/2019 | Hwang ............... | G05B 13/027 |
| 2020/0019237 A1 * | 1/2020 | Jackson ................. | G06F 3/013 |
| 2020/0061822 A1 | 2/2020 | Luo | |
| 2020/0094403 A1 | 3/2020 | Kuffner | |

FOREIGN PATENT DOCUMENTS

| | | | |
|---|---|---|---|
| KR | 10-2019-0047640 A | 5/2019 | |
| KR | 10-2019-0102148 A | 9/2019 | |
| KR | 10-2043954 B1 | 11/2019 | |
| WO | WO-9926126 A1 * | 5/1999 | ............. A61B 3/113 |

OTHER PUBLICATIONS

A. Saran et al. "Human Gaze Following for Human-Robot Inter-action", Human Gaze Following for Human-Robot Interaction, Oct. 1-5, 2018, (7 total pages).
J. Yucel et al., "Joint Attention by Gaze Interpolation and Saliency", IEEE Transactions on Cybernetics, vol. 43, No. 3, Jun. 2013, (4 total pages).
M. J. Marin-Jimenez et al., "Detecting People Looking at Each Other in Videos", International Journal of Computer Vision, DOI 10.1007/s11263-013-0655-7, Feb. 2014, (15 total pages).
M. Cohen et al., "Detecting Mutual Awareness Events", IEEE Transactions on Pattern Analysis and Machine Intelligence, vol. 34, No. 12, Dec. 2012, (14 total pages).
B. Masse et al., "Extended Gaze Following: Detecting Objects in Videos Beyond the Camera Field of View", IEEE, Feb. 2019, (8 total pages).
International Search Report (PCT/ISA/210) dated Sep. 28, 2021 issued by the International Searching Authority in International Application No. PCT/KR2021/008435.
Written Opinion (PCT/ISA/237) dated Sep. 28, 2021 issued by the International Searching Authority in International Application No. PCT/KR2021/008435.
Wang et al., "SLAM-based Localization of 3D Gaze using a Mobile Eye Tracker", ETRA '18: 2018 Symposium on Eye Tracking Research and Applications, Jun. 14, 2018, 5 total pages, doi:10.1145/3204493.3204584.
Communication dated Nov. 17, 2023, issued by the European Patent Office in European Patent Application No. 21856061.3.
Communication dated May 22, 2025, issued by Korean Intellectual Property Office in Korean Patent Application No. 10-2020-0102283.
Communication dated Jul. 16, 2025, issued by European Patent Office in European Patent Application No. 21856061.3.
Communication issued Nov. 13, 2025 by the Korean Intellectual Property Office in Korean Patent Application No. 10-2020-0102283.

* cited by examiner

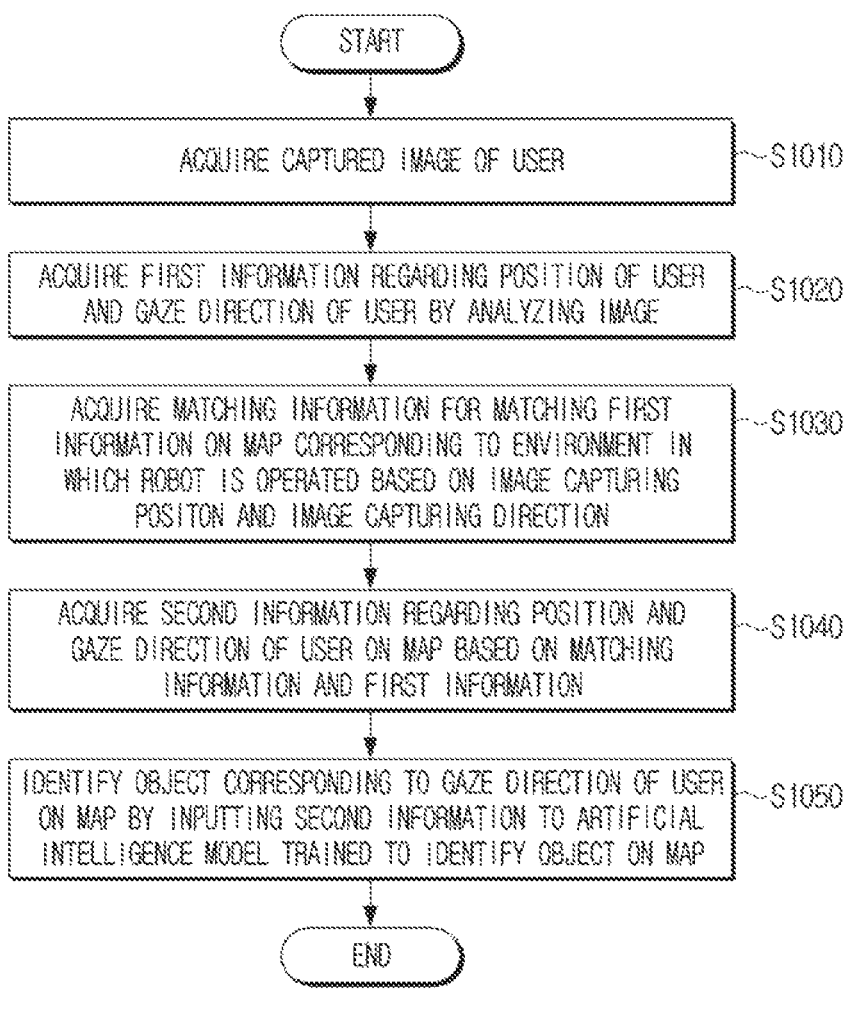

START

ACQUIRE CAPTURED IMAGE OF USER ~S1010

ACQUIRE FIRST INFORMATION REGARDING POSITION OF USER AND GAZE DIRECTION OF USER BY ANALYZING IMAGE ~S1020

ACQUIRE MATCHING INFORMATION FOR MATCHING FIRST INFORMATION ON MAP CORRESPONDING TO ENVIRONMENT IN WHICH ROBOT IS OPERATED BASED ON IMAGE CAPTURING POSITON AND IMAGE CAPTURING DIRECTION ~S1030

ACQUIRE SECOND INFORMATION REGARDING POSITION AND GAZE DIRECTION OF USER ON MAP BASED ON MATCHING INFORMATION AND FIRST INFORMATION ~S1040

IDENTIFY OBJECT CORRESPONDING TO GAZE DIRECTION OF USER ON MAP BY INPUTTING SECOND INFORMATION TO ARTIFICIAL INTELLIGENCE MODEL TRAINED TO IDENTIFY OBJECT ON MAP ~S1050

END

ROBOT AND METHOD FOR CONTROLLING SAME

CROSS-REFERENCE TO RELATED APPLICATIONS

This application is a by-pass continuation of International Application No. PCT/KR2021/008435, filed on Jul. 2, 2021, which is based on and claims priority to Korean Patent Application No. 10-2020-0102283, filed on Aug. 14, 2020, in the Korean Intellectual Property Office, the disclosures of which are incorporated by reference herein in their entireties.

BACKGROUND

1. Field

The disclosure relates to a robot and a control method thereof, and more particularly, to a robot for identifying an object gazed at by a user in an image captured by the robot and a control method thereof.

2. Description of Related Art

There are various methods for identifying an object gazed at by a user based on a gaze direction of the user in an image captured of the user.

Specifically, there are technologies for identifying an object gazed at by a user in an image by identifying a head pose or eye gaze direction of the user in the image.

However, the various methods according to the related art have a problem that the image needs to include the object gazed at by the user, and it is difficult to identify the object when the object gazed at by the user is not included in the image.

SUMMARY

Provided are a robot capable of identifying an object gazed at by a user by using a captured image of the user and map information corresponding to an environment in which the robot is operated, and a control method thereof.

According to an aspect of the disclosure, a control method of a robot, includes: acquiring an image of a user; acquiring, by analyzing the image, a first information regarding a position of the user and a gaze direction of the user; acquiring, based on an image capturing position associated with the image and an image capturing direction associated with the image, matching information for matching the first information with a map corresponding to an environment in which the robot is operated; acquiring, based on the matching information and the first information, second information regarding the position of the user on the map and the gaze direction of the user on the map; and identifying an object corresponding to the gaze direction of the user on the map by inputting the second information into an artificial intelligence model trained to identify an object on the map.

The acquiring the first information may further include: identifying a region of the image corresponding to a head of the user; identifying the position of the user based on the identified region; and identifying the gaze direction based on a head pose within the identified region.

The acquiring the matching information may include identifying information regarding a position and a direction of the robot on the map at a point in time when the image is acquired by using a simultaneous localization and mapping (SLAM) method.

The acquiring the second information may include acquiring input data by mapping the second information on a grid map corresponding to the map, and the identifying the object further may include: identifying coordinates corresponding to a position of the object on the grid map by inputting the input data to the artificial intelligence model; and identifying the object corresponding to the gaze direction of the user on the map based on the identified coordinates.

The artificial intelligence model may be trained by using, as output data, data regarding the coordinates corresponding to the position of the object on the grid map, and by using, as input data, first input data including binary data mapped onto the grid map based on a direction defined by a path from a set of training coordinates on the grid map toward the position of the object on the grid map.

The artificial intelligence model may be trained by using, as output data, data regarding the coordinates corresponding to the position of the object on the grid map, and by using, as input data, second input data acquired based on the image of the user gazing at the object in the environment in which the robot is operated.

The control method may further include: based on the object being identified, performing rotation to include the object within a viewing angle of a camera of the robot; based on a hand of the user being included in the viewing angle of the camera during the rotation, identifying a direction information corresponding with a position of the hand; acquiring a third information obtained by updating information regarding the gaze direction of the user included in the second information based on the direction information corresponding to the position of the hand; and identifying the object corresponding to a gaze of the user on the map by applying the third information to the artificial intelligence model.

The control method may further include: based on a command corresponding to the object from the user, identifying the object corresponding to a gaze of the user on the map based on the image of the user; and executing a task corresponding to the command.

The object may not be included in the image.

According to an aspect of the disclosure, a robot includes: a memory configured to store at least one instruction; a camera configured to capture an image of a user; and a processor connected to the memory and the camera and configured to execute the at least one instruction to: acquire an image of the user captured by the camera, acquire, by analyzing the image of the user, first information regarding a position of the user and a gaze direction of the user, acquire, based on an image capturing position associated with the image and an image capturing direction associated with the image, matching information for matching the first information with a map corresponding to an environment in which the robot is operated, acquire, based on the matching information and the first information, second information regarding the position and the gaze direction of the user on the map, and identify an object corresponding to the gaze direction of the user on the map by inputting the second information to an artificial intelligence model trained to identify an object on the map.

The processor may be further configured to: identify a region of the image corresponding to a head of the user, identify the position of the user based on the identified region, and identify the gaze direction of the user based on a head pose within the identified region.

3                                                              4

The processor may be further configured to acquire the matching information by identifying information regarding a position and a direction of the robot on the map when capturing the image by using a simultaneous localization and mapping (SLAM) method.

The processor may be further configured to: acquire an input data by mapping the second information on a grid map corresponding to the map, identify coordinates corresponding to a position of the object on the grid map by inputting the input data to the artificial intelligence model, and identify the object corresponding to the gaze direction of the user on the map based on the identified coordinates.

The artificial intelligence model may be trained by using, as output data, data regarding the coordinates corresponding to the position of the object on the grid map, and by using, as input data, first input data including binary data mapped onto the grid map based on a direction defined by a path from a set of training coordinates on the grid map toward the position of the object on the grid map.

The artificial intelligence model may be trained by using, as output data, data regarding the coordinates corresponding to the position of the object on the grid map, and by using, as input data, second input data acquired based on the captured image of the user gazing at the object in the environment in which the robot is operated.

As described above, according to one or more embodiments of the disclosure, it may be possible to identify an object gazed at by a user even when the object gazed at by the user is not present within a viewing angle of the camera of the robot.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a flowchart for describing a control method of the robot according to the disclosure.

DETAILED DESCRIPTION

Hereinafter, embodiments of the disclosure will be described in detail with reference to the accompanying drawings.

Figure 1:
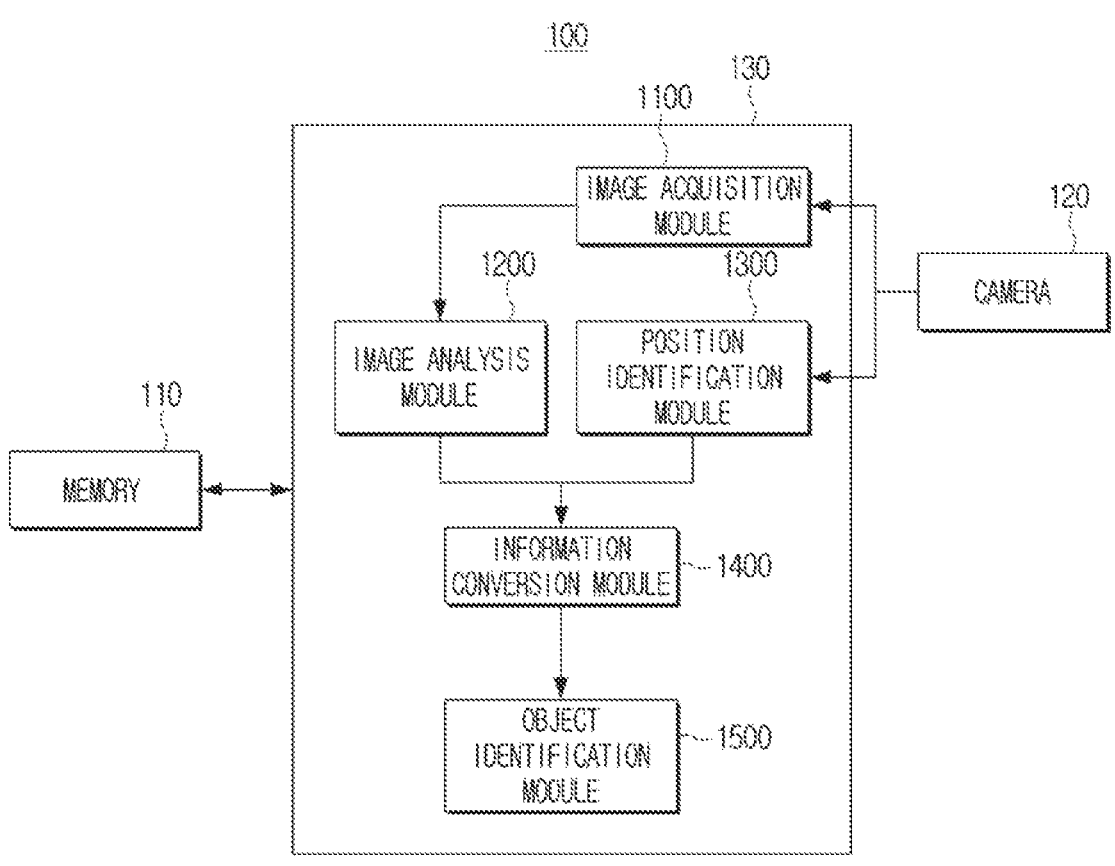
FIG. 1 is a block diagram for describing a configuration of a robot according to an embodiment of the disclosure.

FIG. 1 is a block diagram for describing a configuration of a robot according to an embodiment of the disclosure. A robot 100 according to the disclosure may determine positions of a plurality of objects captured by using a camera 120.

Referring to FIG. 1, the robot 100 may include a memory 110, a camera 120, and a processor 130. The robot 100 according to the disclosure may be implemented by various types of electronic devices capable of automated driving.

The memory 110 may store various programs and data required for an operation of the robot 100. Specifically, at least one instruction may be stored in the memory 110. The processor 130 may perform the operation of the robot 100 by executing the instruction stored in the memory 110.

The camera 120 may capture an image of an environment in which the robot 100 is operated during traveling of the robot 100. The robot 100 may capture an image including a face of a user by using the camera 120.

The processor 130 may drive an operating system or an application program to control hardware or software components connected to the processor 130, and may perform various types of data processing and calculation. In addition, the processor 130 may load and process commands or data received from at least one of the other components into a volatile memory, and store various data in a non-volatile memory.

In particular, the processor 130 may provide a gazed object identification function for identifying an object gazed by a user. That is, with the gazed object identification function, the robot 100 may identify an object gazed by the user among a plurality of objects present in the environment in which the robot 100 is operated.

According to an embodiment of the disclosure, as illustrated in FIG. 1, the gazed object identification function may be implemented by a plurality of modules 1100 to 1500 included in the processor 130. A plurality of modules for implementing the gazed object identification function may be included in the robot 100, but this is only an example, and at least some of the modules for implementing the gazed object identification function may be included in an external server.

As described above, the plurality of modules 1100 to 1500 may be positioned in the processor 130, but the positions of the modules 1100 to 1500 are not limited thereto, and the plurality of modules 1100 to 1500 may be positioned in the memory 110. In case that the plurality of modules 1100 to 1500 are positioned in the memory 110, the processor 130 may load the plurality of modules 1100 to 1500 from the non-volatile memory to the volatile memory to execute functions of the plurality of modules 1100 to 1500. The loading refers to an operation of loading and storing data stored in the non-volatile memory to and in the volatile memory to enable the processor 130 to access the data.

An image acquisition module 1100 is a component for acquiring, by the robot 100, an image of a user captured by the camera 120.

Figure 2A:
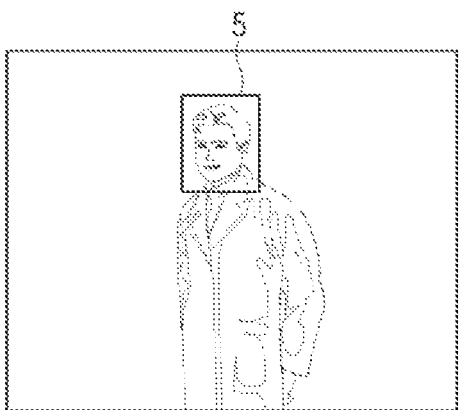
FIG. 2A is a diagram illustrating an image of a user captured by the robot using a camera.

According to an embodiment, based on a command corresponding to an object for a user being detected, the image acquisition module 1100 may acquire an image of the user captured by the camera 120 as illustrated in FIG. 2A. FIG. 2A illustrates the image of the user captured by the robot 100 using the camera 120. Although FIG. 2A illustrates a case where only one user is included in the image captured by the camera 120, the disclosure is not limited thereto, and the image acquisition module 1100 may acquire a captured image of a plurality of users. Further, according to an embodiment, the image captured by the robot 100 does not have to include an object corresponding to a gaze direction of the user.

The command corresponding to the object may be a voice command for instructing the robot 100 to execute a task corresponding to the object, such as "What is this?" or "Bring that one". According to an embodiment, the command corresponding to the object may be a voice command of the user. However, the disclosure is not limited thereto, and the command corresponding to the object may include various user commands, such as a command using a smartphone of the user.

Although it has been described in the above description that the image acquisition module 1100 acquires a captured image of a user based on a command corresponding to an object being detected, embodiments of the disclosure are not limited thereto. As an embodiment, based on a user being detected within a viewing angle of the robot 100, the image acquisition module 1100 may acquire a captured image of the user.

An image analysis module 1200 is a component for identifying first information regarding a position of a user and a gaze direction of the user in an image acquired through the image acquisition module 1100.

The image analysis module 1200 may identify a region corresponding to the head of the user in the image. According to an embodiment, the image analysis module 1200 may identify a region 5 corresponding to the head of the user in the image of FIG. 2A.

According to an embodiment, the image analysis module 1200 may identify a region corresponding to the head of the user in the image by using a vision sensor (for example, an RGB sensor or an RGB-D sensor). That is, the image analysis module 1200 may acquire a bounding box (B-box) region corresponding to the head of the user in the image by using an object detection method. The object detection method refers to a method in which whether or not an object is present in a grid with regular intervals within an image is identified, and a region where the object is present is identified as the B-Box region.

According to an embodiment, the image analysis module 1200 may acquire pixel regions corresponding to the head of the user in the image by using a semantic segmentation method. The semantic segmentation method refers to a method in which all pixels in an image are classified into specific classes to classify a region where an object is positioned in units of pixels.

Based on a region corresponding to the head of the user is identified in the image, the image analysis module 1200 may acquire information regarding the position of the user and the gaze direction of the user based on the identified region. The information regarding the gaze direction of the user may be acquired based on a direction in which the head of the user is directed in the image or an eye gaze direction of the user in the image.

Figure 2B:
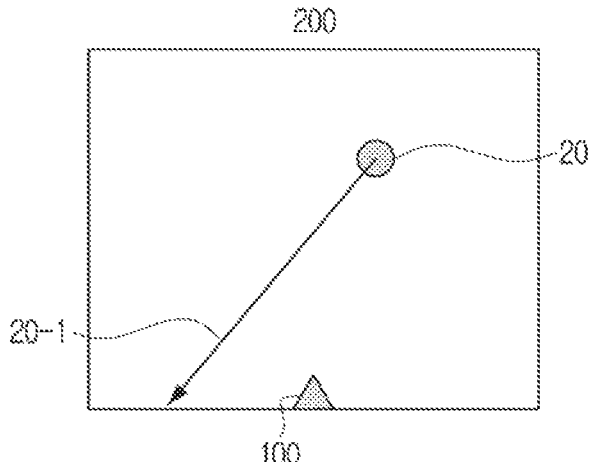
FIG. 2B is a diagram illustrating a state in which information regarding a position of a user and a gaze direction of the user in an image with respect to the robot is displayed on a virtual top-view map.

FIG. 2B is a diagram illustrating a state in which information regarding a position 20 of a user and a gaze direction 20-1 of the user in an image with respect to the robot 100 is displayed on a virtual top-view map. The image analysis module 1200 may acquire the information regarding the position of the user and the gaze direction of the user with respect to the robot 100 as illustrated in FIG. 2B.

A position identification module 1300 is a component for identifying an image capturing position and an image capturing direction of the robot 100 on a map corresponding to an environment in which the robot is operated.

The robot 100 may acquire the map corresponding to the environment in which the robot 100 is operated by using a simultaneous localization and mapping (SLAM) method using a LiDAR sensor or a vision SLAM method using a camera. Simultaneous localization and mapping (SLAM) is a technology for estimating a map of an arbitrary space and a current position of an electronic device that is able to search the surroundings of the arbitrary space while moving in the arbitrary space.

The robot 100 may generate the map corresponding to the environment in which the robot 100 is operated by itself, but is not limited thereto. The robot 100 may receive the map corresponding to the environment in which the robot 100 is operated from an external server and store the map in the memory 110.

Figure 3A:
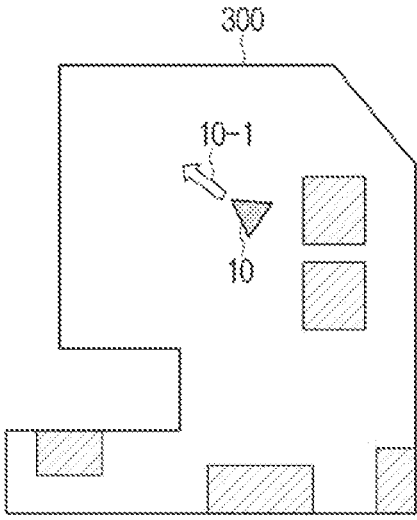
FIG. 3A is a diagram illustrating a state in which an image capturing position and an image capturing direction of the robot are displayed on a map corresponding to an environment in which the robot is operated.

FIG. 3A is a diagram illustrating a state in which an image capturing position and an image capturing direction of the robot are displayed on a map 300 corresponding to the environment in which the robot is operated. The position identification module 1300 may acquire matching information based on an image capturing position 10 and an image capturing direction 10-1 of the robot 100 on the acquired map as illustrated in FIG. 3A. According to an embodiment, the image capturing direction 10-1 of the robot 100 may be a direction in which the center of the viewing angle of the camera 120 when the robot 100 captures the image is directed. For example, the image capturing direction 10-1 of the robot 100 may be a front direction when the robot 100 captures the image.

The matching information is information for matching the first information on the map, and may include information regarding the image capturing position and the image capturing direction of the robot 100 on the map. For example, the position identification module 1300 may acquire the matching information by identifying the information regarding the position and direction of the robot 100 when capturing the image on the map 300 by using the SLAM method.

Further, based on the matching information being acquired, an information conversion module 1400 may acquire second information regarding the position of the user and the gaze direction of the user on the map based on the information (first information) regarding the position of the user and the gaze direction of the user in the image acquired with respect to the robot 100 by the image analysis module 1200, and the information (matching information) regarding the image capturing position and the image capturing direction of the robot 100 on the map 300.

The information conversion module 1400 is a component for converting the first information regarding the position of the user and the gaze direction of the user acquired with respect to the robot 100 into the second information on the map.

Figure 3B:
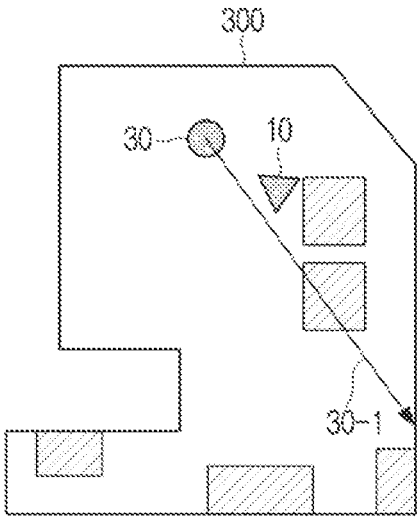
FIG. 3B is a diagram illustrating a state in which the position of the user and the gaze direction of the user in the image are displayed on the map corresponding to the environment in which the robot is operated.

FIG. 3B is a diagram illustrating a state in which a position 30 of the user and a gaze direction 30-1 of the user in the image are displayed on the map corresponding to the environment in which the robot 100 is operated.

The information conversion module 1400 may acquire the second information regarding the position 30 and the gaze direction 30-1 of the user on the map based on the first information and the matching information.

Referring to FIGS. 2B, 3A, and 3B, the position 20 of the i-th user with respect to the robot 100 included in the first information may be defined as $X_L^i=(x_L^i,y_L^i)$, the gaze direction 20-1 of the i-th user with respect to the robot 100 may be defined as and the matching information including $(x_G^r, y_G^r)$, which is the image capturing position 10 of the robot 100 on the map 300, and $\theta_G^r$, which is the image capturing direction 10-1 on the map 300, may be defined as $X_G^r=(x_G^r, y_G^r,\theta_G^r)$.

Further, the information conversion module 1400 may convert $X_L^i=(x_L^i,y_L^i)$, which is the position 20 of the i-th user with respect to the robot 100, into $X_G^i=(x_G^i,y_G^i)$, which is the position 30 of the user on the map 300 corresponding to the environment in which the robot 100 is operated, by using the matching information $X_G^r=(x_G^r,y_G^r,\theta_G^r)$. A formula for converting $X_L^i$ to $X_G^i$ is as Expression 1.

$$\begin{vmatrix} x_G^i \\ y_G^i \\ 1 \end{vmatrix} = \begin{vmatrix} \cos\theta_G^r & -\sin\theta_G^r & x_G^r \\ \sin\theta_G^r & \cos\theta_G^r & y_G^r \\ 0 & 0 & 0 \end{vmatrix} \begin{vmatrix} x_L^i \\ y_L^i \\ 1 \end{vmatrix} \qquad \text{Expression 1}$$

Then, the information conversion module 1400 may convert $\Phi_L^i$, which is the gaze direction 20-1 of the i-th user with respect to the robot 100, into $\theta_G^i$, which is the gaze direction 30-1 on the map 300 corresponding to the environment in which the robot is operated, by using the matching information. A formula for converting $\Phi_L^i$ to $\theta_G^i$ is as Expression 2.

$$\Phi_G^i=\Phi_L^i-\theta_G^r \qquad \text{Expression 2:}$$

Further, based on $X_G^r$, which is the position 30 of the user on the map 300, being acquired, the information conversion module 1400 may map $X_G^r$, which is the position 30 of the user on the map 300, to position coordinates $p_t^i=(u_t^i,v_t^i)$ on a grid map. For example, the position coordinates $p_t^i$ of the user on the grid map may be coordinates corresponding to 30 in FIG. 4A.

The grid map is a map obtained by converting a region on the map corresponding to the environment in which the robot 100 is operated into a two-dimensional grid having a size of $S_U\times S_V$. $S_U$ indicates the number of cells on the x-axis of the grid map, and $S_V$ indicates the number of cells on the y-axis of the grid map. For example, the size of one cell may be 5 cm, but is not limited thereto.

The position coordinates $p_t^i$ represent position coordinates of the i-th user on the grid map at time t. A formula for mapping the position $X_G^i$ of the user on the map to the position coordinates $p_t^i=(u_t^i,v_t^i)$ on the grid map is as Expression 3.

$$p^i = \begin{cases} u^i = \left[ S_U \times \dfrac{x_G^i - x_{min}}{x_{max} - x_{min}} \right] \\ v^i = \left[ S_V \times \dfrac{y_G^i - y_{min}}{y_{max} - y_{min}} \right] \end{cases} \qquad \text{Expression 3}$$

$$x \in [x_{min}, x_{max}], \, y \in [y_{min}, y_{max}]$$

In Expression 3, $[x_{min},x_{max}]$ represents an x-axis boundary range for the gaze direction of the user, and $[y_{min},y_{max}]$ represents a y-axis boundary range for the gaze direction of the user. According to an embodiment, the boundary range may be a range corresponding to the entire region of the map corresponding to the environment in which the robot 100 is operated. However, embodiments of the disclosure are not limited thereto, and the boundary range may be a range corresponding to a space (for example, a living room) in which the user is positioned on the map.

Further, based on the position $X_G^i$ of the user on the map being mapped to the position coordinates $p_t^i=(u_t^i,v_t^i)$ on the grid map, the information conversion module 1400 may map the gaze direction $\Phi_G^i$ of the user on the grid map. For example, the gaze direction $\Phi_G^i$ of the user on the grid map may be a direction corresponding to 30-1 in FIG. 4A.

Figure 4A:
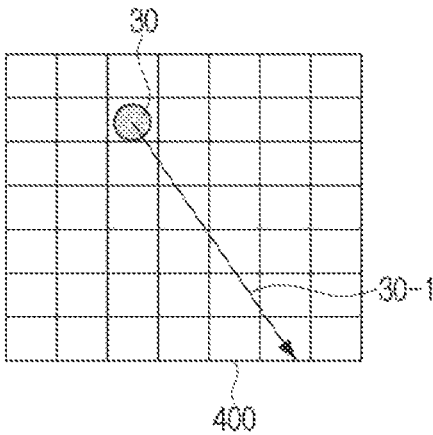
FIG. 4A is a diagram illustrating a state in which position coordinates and a gaze direction corresponding to one user are displayed on a grid map.
Figure 4B:
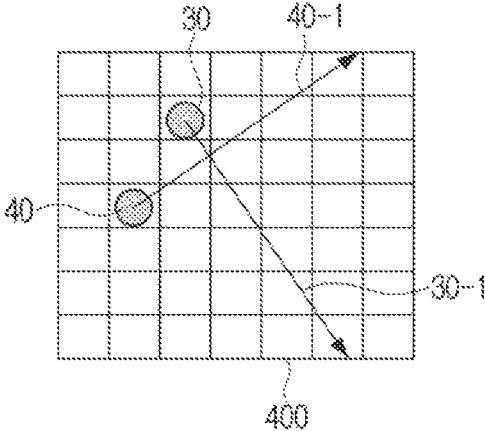
FIG. 4B is a diagram illustrating a state in which position coordinates and gaze directions corresponding to two users are displayed on the grid map.

FIGS. 4A and 4B are diagrams each illustrating a state in which the position coordinates and the gaze direction corresponding to the user are displayed on the grid map.

FIG. 4A is a diagram illustrating position coordinates 30 $(p_t^i)$ corresponding to the position $(X_G^i)$ of the user on the map and the gaze direction 30-1 $(\Phi_G^i)$ of the user on the grid map.

Based on the position coordinates 30 $(p_t^i)$ and the gaze direction 30-1 $(\Phi_G^i)$ of the user matching on a grid map 400, the information conversion module 1400 may generate input data by using information regarding the mapped grid map.

Although FIG. 4A illustrates a case where position coordinates and a gaze direction corresponding to one user match on the grid map 400, embodiments of the disclosure are not limited thereto, and position coordinates corresponding to each of a plurality of users and a gaze direction of each of the plurality of users may match on the grid map 400. That is, in case that two users are included in an image captured by the robot 100, the information conversion module 1400 may match position coordinates 30 and 40 of the two users and gaze directions 30-1 and 40-1 of the two users on the grid map 400 as illustrated in FIG. 4B.

Figure 5A:
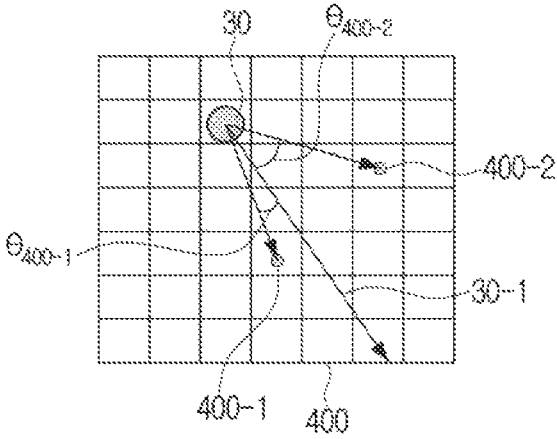
FIG. 5A is a diagram for describing a method for generating input data of an artificial intelligence model according to an embodiment of the disclosure.
Figure 5B:
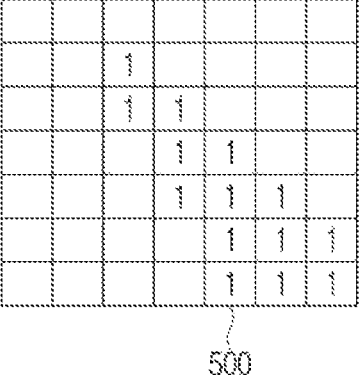
FIG. 5B is a diagram for describing the input data of the artificial intelligence model according to an embodiment of the disclosure.

FIG. 5A is a diagram for describing a method for generating input data of an artificial intelligence model according to an embodiment of the disclosure, and FIG. 5B is a diagram for describing the input data of the artificial intelligence model according to an embodiment of the disclosure.

The information conversion module 1400 may generate the input data to be input to the artificial intelligence model as illustrated in FIG. 5B by using the position coordinates 30 and the gaze direction 30-1 of the user mapped on the grid map as illustrated in FIG. 4A. The artificial intelligence model according to the disclosure may be an artificial intelligence model trained to identify an object on the map corresponding to the environment in which the robot 100 is operated, and a method for training the artificial intelligence model will be described later with reference to FIG. 8.

Specifically, the information conversion module 1400 may identify cell coordinates within a predetermined angle (for example, 20 degrees) with respect to the gaze direction 30-1 ($\Phi_G^i$) and the position coordinates 30 ($p_t^i$) of the user mapped on the grid map.

For example, referring to FIG. 5A, an angle $\theta_{400-1}$ between the gaze direction 30-1 ($\Phi_G^i$) of the user based on the position coordinates 30 ($p_t^i$) and a direction of first cell coordinates 400-1 based on the position coordinates 30 ($p_t^i$) may be equal to or less than a predetermined angle (for example, 20 degrees) on the grid map 400.

Further, an angle $\theta_{400-2}$ between the gaze direction 30-1 ($\Phi_G^i$) of the user based on the position coordinates 30 ($p_t^i$) and a direction of second cell coordinates 400-2 based on the position coordinates 30 ($p_t^i$) may exceed a predetermined angle (for example, 20 degrees) on the grid map 400. In this case, the information conversion module 1400 may map the first cell coordinates 400-1 to "1" and may map the second cell coordinates 400-2 to "0" on the grid map.

The information conversion module 1400 may generate input data 500 including binary data as illustrated in FIG. 5B by performing the above-described mapping process for all cell coordinates on the grid map.

Then, based on the input data is generated, an object identification module 1500 may input the input data 500 to the trained artificial intelligence model to identify the object corresponding to the gaze direction of the user on the map.

The object identification module 1500 is a component for identifying an object corresponding to a gaze direction of a user on the map.

Based on the input data is generated from the information conversion module 1400, the object identification module 1500 may input the input data to a trained artificial intelligence model 600 to acquire output data. The artificial intelligence model 600 is a model for generating output data in which a probability value for each of cell coordinates at which the object is expected to be present is displayed on the grid map. The output data is data in the form of a heat map in which a probability for each of cell coordinates at which an object corresponding to a gaze direction of a user is expected to be present on the grid map is displayed for each of the cell coordinates.

According to an embodiment, the artificial intelligence model 600 may be implemented by a convolutional encoder/decoder network. For example, the convolutional encoder/decoder network may be implemented by Mean-2D-Enc, 2D-Enc, 3D-Enc, and 3D/2D U-Net structures.

According to an embodiment, the artificial intelligence model 600 may be trained by using, as the input data, first input data labeled based on a direction toward a first object from a coordinates on the grid map and/or second input data acquired based on a captured image of a user who gazes at the first object in the environment in which the robot is operated, and by using, as the output data, data in which a probability value of each of cell coordinates corresponding to the first object is displayed on the grid map. A specific method for training the artificial intelligence model 600 will be described later with reference to FIG. 8.

Figure 6A:
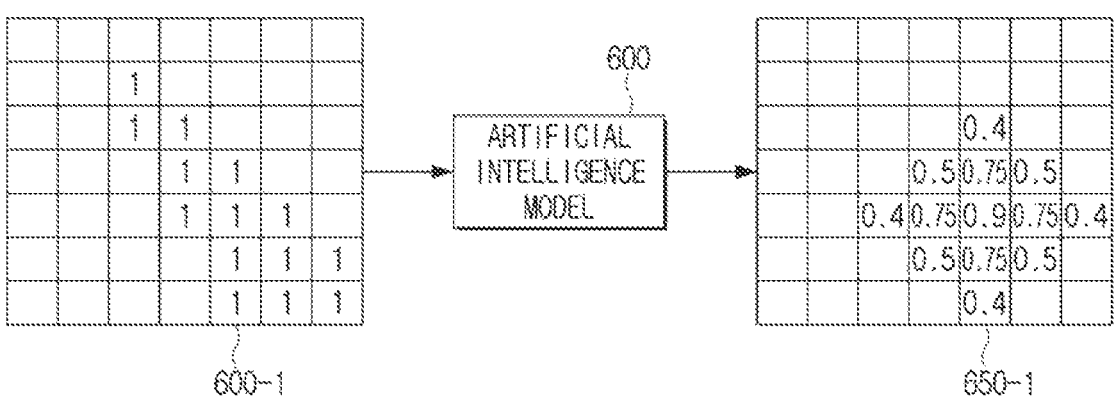
FIG. 6A is a diagram for describing a method for acquiring output data by inputting input data to a trained artificial intelligence model.
Figure 6B:
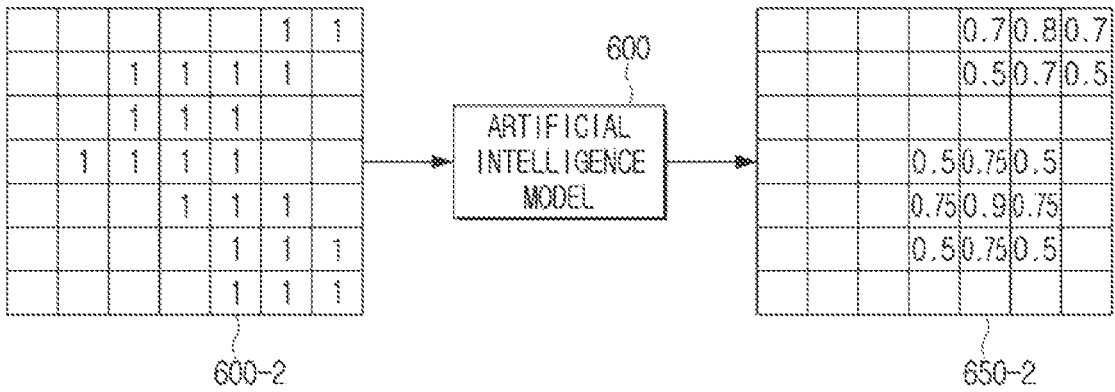
FIG. 6B is a diagram for describing the method for acquiring output data by inputting input data to a trained artificial intelligence model.

FIGS. 6A and 6B are diagrams for describing a method for acquiring the output data by inputting the input data to the trained artificial intelligence model 600.

Referring to FIG. 6A, the object identification module 1500 may acquire output data 650-1 in the form of a heat map in which a probability value for each of cell coordinates at which an object is expected to be positioned is displayed for each of the cell coordinates on the grid map, by inputting input data 600-1 generated based on a captured image of one user to the artificial intelligence model 600. That is, the output data 650-1 of FIG. 6A may be output data in which a probability value for each of cell coordinates at which an object corresponding to a gaze direction of one user is expected to be present is displayed for each of the cell coordinates on the grid map based on the second information corresponding to the captured image of the one user as illustrated in FIG. 4A.

Further, referring to FIG. 6B, the object identification module 1500 may acquire output data 650-2 including probability values for two objects by inputting input data 600-2 generated based on a captured image of two users to the artificial intelligence model 600. That is, the output data 650-2 of FIG. 6B may be output data in which a probability value for each of cell coordinates at which each of two objects corresponding to gaze directions of two user is expected to be positioned is displayed for each of the cell coordinates on the grid map based on the second information corresponding to the captured image of the two users as illustrated in FIG. 4B.

Figure 7:
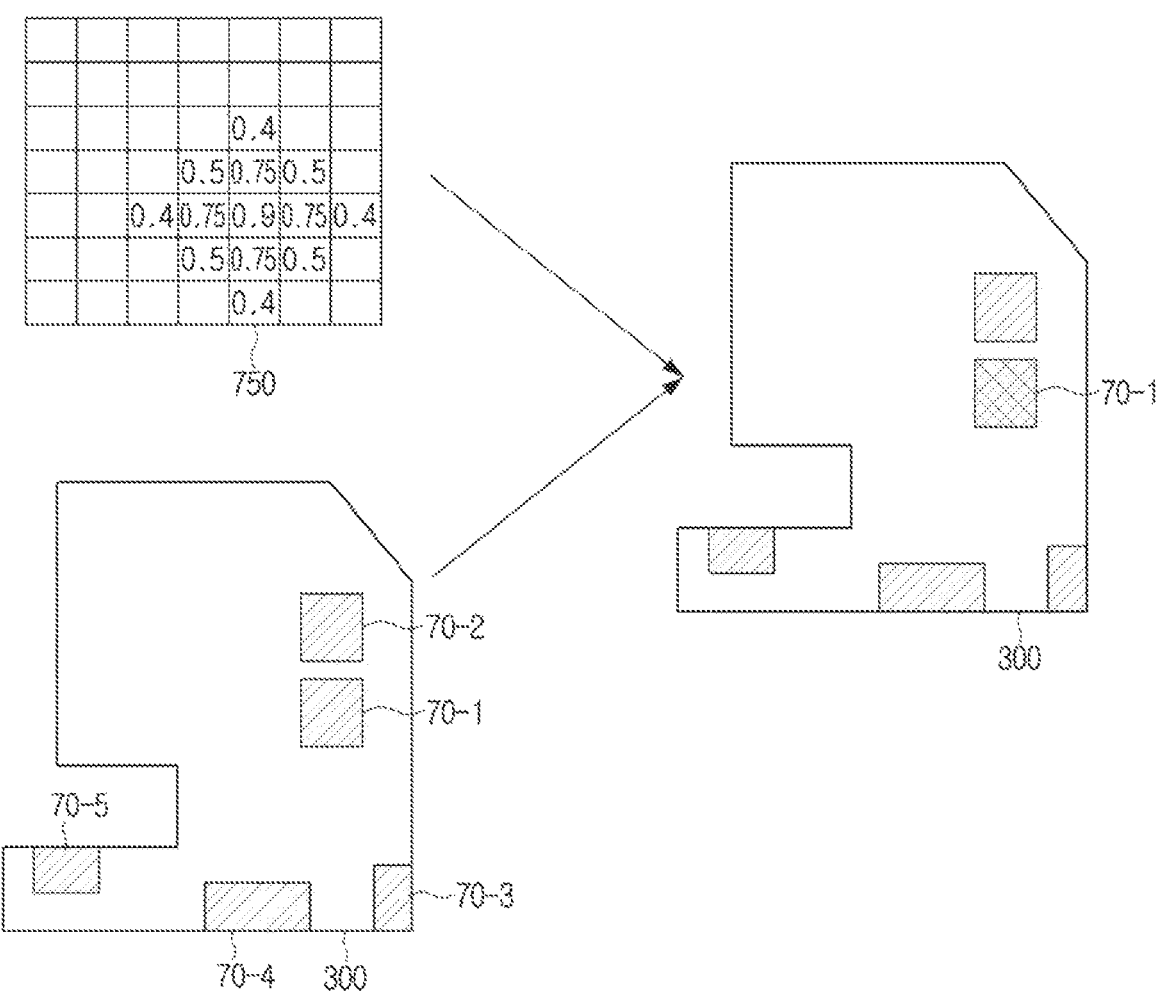
FIG. 7 is a diagram for describing a method for identifying an object corresponding to a gaze direction of a user on a map.

Based on output data is acquired from the artificial intelligence model, the object identification module 1500 may identify an object 70-1 corresponding to a gaze direction of a user on the map 300 by using output data 750 and the map 300 corresponding to the environment in which the robot 100 is operated as illustrated in FIG. 7. FIG. 7 is a diagram for describing a method for identifying the object 70-1 corresponding to the gaze direction of the user on the map 300.

The object identification module 1500 may identify estimated coordinates of the object corresponding to the gaze direction of the user by using the output data 750 acquired from the artificial intelligence model. Specifically, the object identification module 1500 may identify the estimated coordinates by obtaining local maximum points for the output data 750 using a peak detection technique. That is, the object identification module 1500 may identify, as the estimated coordinates, cell coordinates corresponding to the local maximum point in a function for a probability value for each of cell coordinates in the output data 750.

In addition, the object identification module 1500 may identify object coordinates of each of one or more objects included in the map 300. In addition, the object identification module 1500 may identify coordinates corresponding to the object 70-1 closest to the estimated coordinates by comparing the object coordinates of one or more objects with the estimated coordinates. In addition, the object 70-1 corresponding to the coordinates of the identified object may be identified as an object corresponding to the gaze direction of the user.

A function related to artificial intelligence according to the disclosure is executed by the processor 130 and the memory 110.

The processor 130 may include one or more processors. In this case, one or more processors may be general-purpose processors such as a central processing unit (CPU), an application processor (AP), graphics-dedicated processors such as a graphic processing unit (GPU) and a vision processing unit (VPU), or artificial intelligence-dedicated processors such as a neural processing unit (NPU).

One or more processors perform control to process input data according to a predefined operation rule stored in the memory or an artificial intelligence model. The predefined operation rule or artificial intelligence model is generated by learning.

The generation by learning means that a predefined operation rule or artificial intelligence model having a desired characteristic is generated by applying a learning algorithm to a plurality of learning data. Such learning may be performed in a device itself in which the artificial intelligence according to the disclosure is performed or may be performed through a separate server and/or system.

The artificial intelligence model may include a plurality of neural network layers. Each layer has a plurality of weight values, and performs layer calculation by performing calculation using a calculation result of the previous layer and the plurality of weights. Examples of the neural network include a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-Networks, and the neural network according to embodiments of the disclosure are not limited to the examples described above except for a case where it is specified.

The learning algorithm is a method of training a predetermined target device (for example, a robot) by using a plurality of learning data to allow the predetermined target device to make a decision or make a prediction by itself. Examples of the learning algorithm include supervised learning, unsupervised learning, semi-supervised learning, and reinforcement learning, and the learning algorithm according to embodiments of the disclosure are not limited to the examples described above except for a case where it is specified.

Figure 8:
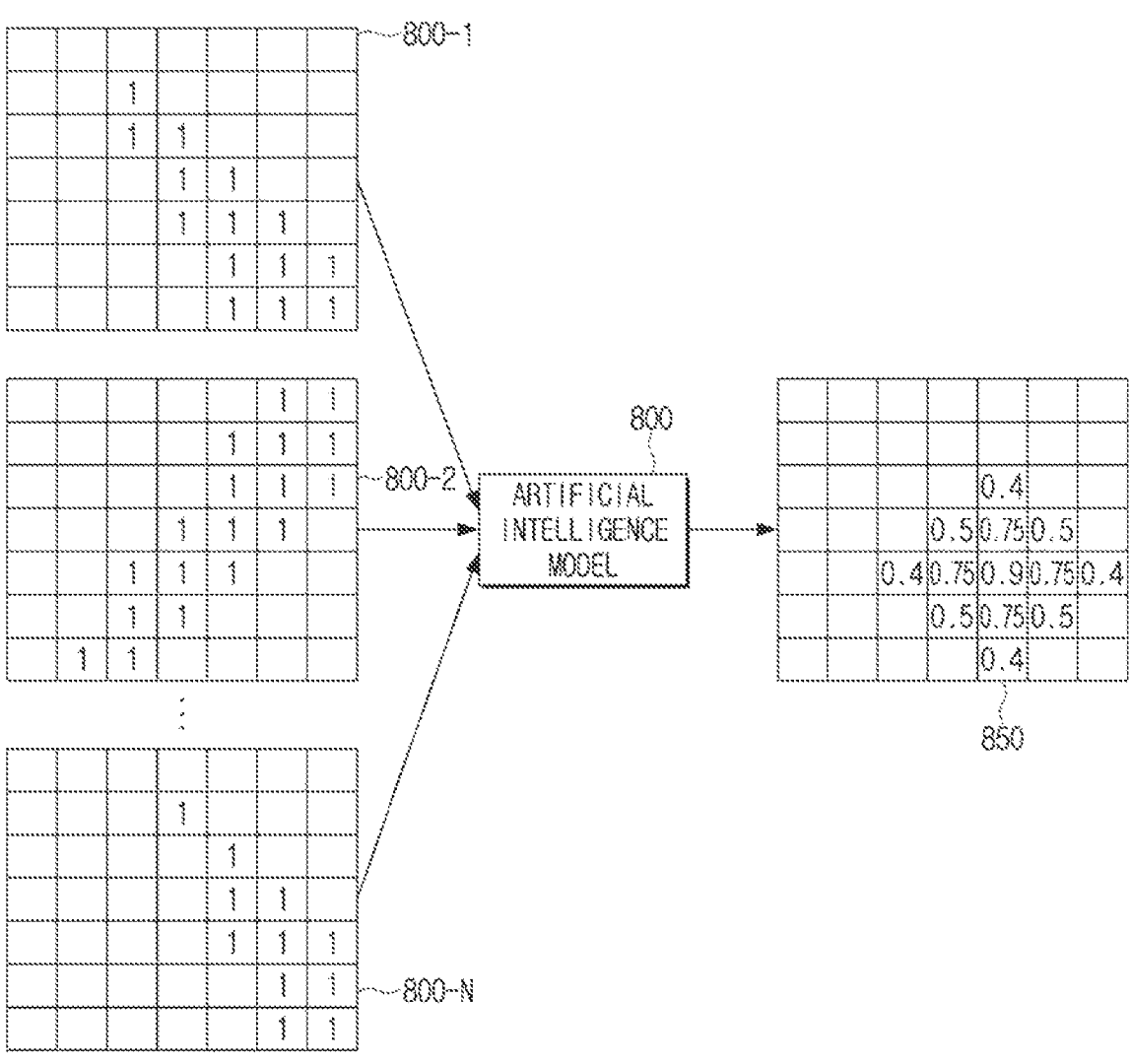
FIG. 8 is a diagram for describing learning data for training an artificial intelligence model according to an embodiment of the disclosure.

FIG. 8 is a diagram for describing learning data for training an artificial intelligence model according to an embodiment of the disclosure.

Referring to FIG. 8, an artificial intelligence model 800 may be trained by using, as input data, a plurality of input learning data 800-1 to 800-N and by using, as output data for each of the plurality of input learning data 800-1 to 800-N, one output learning data 850.

According to an embodiment, the plurality of input learning data 800-1 to 800-N may be first input data in which binary data is mapped on the grid map based on information regarding a direction from a coordinates on the grid map toward coordinates corresponding to a position of an object.

That is, the first input data may be input data in which information corresponding to a gaze direction of a virtual user toward an object at coordinates corresponding to a position of the virtual user on the grid map is mapped on the grid map, rather than input data acquired based on a captured image of a real user.

In addition, the output learning data 850 for the plurality of input learning data 800-1 to 800-N may be data in the form of a heat map generated based on coordinates corresponding to a position of a real object corresponding to the input learning data on the grid map. That is, the output learning data 850 is not data regarding a value of a probability that an object is present, but is data regarding a value of a probability generated based on a position of a real object.

In FIG. 8, although the plurality of input learning data 800-1 to 800-N are illustrated as binary according to direction information from coordinates corresponding to a position of one virtual user to coordinates corresponding to one object in each input learning data, the input learning data according to embodiments of the disclosure are not limited thereto.

According to an embodiment, the input learning data may be binary data according to direction information from each of coordinates corresponding to positions of a plurality of virtual users to coordinates corresponding to one object.

According to an embodiment, the input learning data may be binary data according to direction information from each of coordinates corresponding to positions of a plurality of virtual users to coordinates corresponding to a plurality of objects. In this case, the output learning data may be data in the form of a heat map generated based on coordinates corresponding to positions of a plurality of real objects corresponding to the input learning data on the grid map.

According to an embodiment, the plurality of input learning data 800-1 to 800-N of FIG. 8 may be second input data acquired based on a captured image of at least one user. That is, the second input data may be input data acquired based on a captured image of at least one user who gazes at at least one object in the environment in which the robot 100 is operated.

Further, output learning data corresponding to the second input data may be data in the form of a heat map generated based on coordinates corresponding to a position of the at least one object actually gazed by the at least one user.

In addition, the robot 100 may train the artificial intelligence model 800 based on learning data for each object present in the map corresponding to the environment in which the robot 100 is operated. That is, a first artificial intelligence model corresponding to a first map may be an artificial intelligence model trained based on learning data for all objects present in the first map, and a second artificial intelligence model corresponding to a second map may be an artificial intelligence model trained based on learning data for all objects present in the second map.

The robot 100 may update the artificial intelligence model by training the artificial intelligence model 800 with the above-described learning data. However, embodiments of the disclosure are not limited thereto, and the robot 100 may acquire a trained artificial intelligence model from an external server.

According to an embodiment, the robot 100 may update the artificial intelligence model 800 by training the artificial intelligence model 800 at a predetermined interval (for example, 24 hours). However, embodiments of the disclosure are not limited thereto, and the artificial intelligence model 800 may be manually trained by an administrator of the robot 100.

According to an embodiment, in case that a position of at least one object is changed or an object is added on the map corresponding to the environment in which the robot 100 is operated, the robot 100 may train the artificial intelligence model 800 based on learning data for the position of each updated object.

Figure 9A:
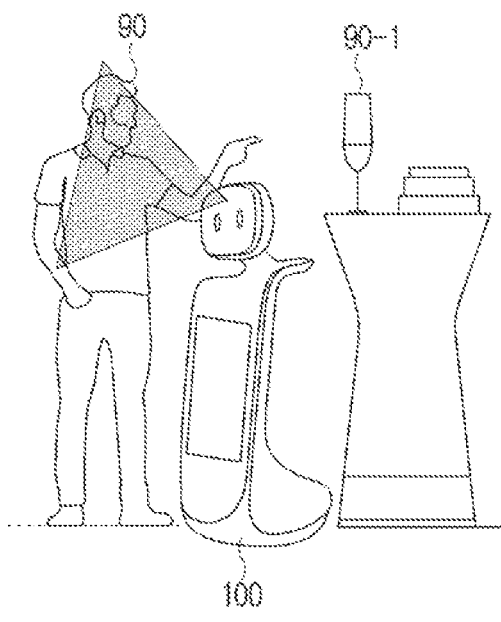
FIG. 9A is a diagram for describing a method for identifying an object by using a direction corresponding to a hand of a user according to an embodiment of the disclosure.
Figure 9B:
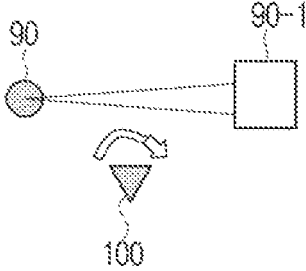
FIG. 9B is a diagram for describing the method for identifying an object by using a direction corresponding to a hand of a user according to an embodiment of the disclosure.
Figure 9C:
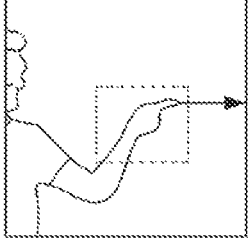
FIG. 9C is a diagram for describing the method for identifying an object by using a direction corresponding to a hand of a user according to an embodiment of the disclosure.

FIGS. 9A to 9C are diagrams for describing a method for identifying an object by further using a direction corresponding to a hand of a user according to an embodiment of the disclosure.

As described above with reference to the drawings, the robot 100 may identify a gaze direction of a user by using a head pose of the user or an eye gaze direction of the user detected based on an eye region of the user. However, embodiments of the disclosure are not limited thereto, and the gaze direction of the user may be identified by further using a direction corresponding to a hand of the user together with the head pose of the user or the eye gaze direction.

That is, referring to FIG. 9A, the robot 100 may acquire a captured image of the head of a user 90. According to an embodiment, based on a command corresponding to an object 90-1 from the user 90 is detected, the robot 100 may acquire a captured image of the head of the user 90. The command corresponding to the object 90-1 from the user 90 may be, for example, a voice command of the user such as "What is this?" or "Bring that one".

In addition, the robot 100 may primarily estimate the object 90-1 corresponding to the gaze direction of the user based on the captured image of the head of the user 90.

FIG. 9B is a diagram illustrating the position of the user 90, the position of the robot 100, and the position of the estimated object 90-1. Based on the object 90-1 is estimated, the robot 100 may rotate to include the object 90-1 within the viewing angle of the camera 120. Further, based on the hand of the user 90 being included within the viewing angle of the camera 120 during the rotation of the robot 100, the robot 100 may capture an image including the hand of the user 90 as illustrated in FIG. 9C and identify direction information corresponding to the hand of the user 90. According to an embodiment, the direction information corresponding to the hand may be direction information of a finger.

Based on the direction information corresponding to the hand of the user 90 being identified, the robot 100 may acquire third information by updating information regarding the gaze direction included in the existing second information based on the direction information corresponding to the hand. That is, the third information may be information obtained by updating the information regarding the gaze direction included in the second information based on the direction information corresponding to the hand.

Further, the robot 100 may generate input data corresponding to the third information. Then, the robot 100 may identify the object 90-1 corresponding to the gaze of the user 90 by inputting the input data generated based on the third information to the trained artificial intelligence model.

Further, based on the object 90-1 being identified, the robot 100 may execute a task corresponding to the command of the user.

FIG. 10 is a flowchart for describing a control method of the robot according to the disclosure.

The robot 100 may acquire a captured image of a user (S1010).

According to an embodiment, based on a command corresponding to an object from the user being detected, the robot 100 may acquire the captured image of the user. According to an embodiment, the image does not have to include an object corresponding to a gaze direction of the user.

According to an embodiment, based on the user being detected within a viewing angle of the robot 100, the robot 100 may acquire the captured image of the user.

Then, the robot 100 may obtain first information regarding a position of the user and the gaze direction of the user by analyzing the image (S1020). According to an embodiment, the robot 100 may identify a region corresponding to the head of the user in the image, and identify the position of the user based on the identified region. Further, the robot 100 may identify the gaze direction based on a head pose in the identified region.

Then, the robot 100 may acquire matching information for matching the first information on a map corresponding to an environment in which the robot 100 is operated, based on an image capturing position and an image capturing direction (S1030). For example, the robot 100 may acquire the matching information by identifying information regarding the position and direction of the robot when capturing the image on the map corresponding to the environment in which the robot 100 is operated by using the SLAM method.

Then, the robot 100 may acquire second information regarding the position and gaze direction of the user on the map based on the matching information and the first information (S1040).

Next, the robot 100 may input the second information to an artificial intelligence model trained to identify an object on the map, and identify an object corresponding to the gaze direction of the user on the map (S1050).

According to an embodiment, the robot 100 may acquire input data by mapping the second information on a grid map corresponding to the map. Then, the robot 100 may input the input data to the artificial intelligence model to identify coordinates corresponding to the object on the grid map. According to an embodiment, the robot 100 may acquire output data in the form of a heat map indicating a value of a probability that the object is present on the grid map by inputting the input data to the artificial intelligence model. Further, the robot 100 may identify coordinates corresponding to a local maximum point in the output data as the coordinates corresponding to the object. Then, the robot 100 may identify the object corresponding to the gaze direction of the user on the map based on the identified coordinates.

Figure 11:
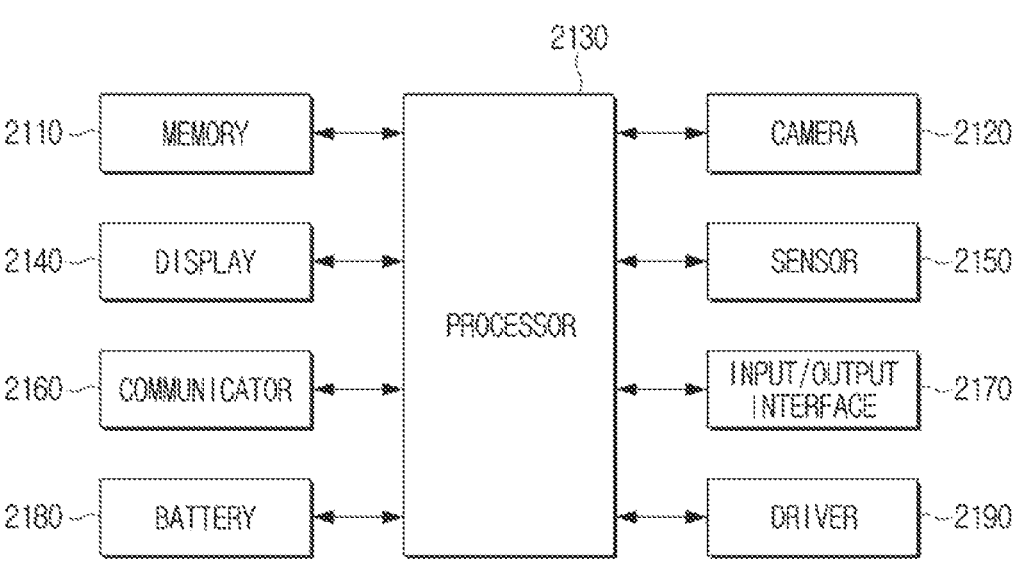
FIG. 11 is a block diagram for describing a specific configuration of the robot according to an embodiment of the disclosure.

FIG. 11 is a block diagram for describing a specific configuration of the robot according to an embodiment of the disclosure. According to an embodiment, FIG. 11 may be a block diagram for a case where a robot 2100 is a robot that may travel.

Referring to FIG. 11, the robot 2100 may include a memory 2110, a camera 2120, a processor 2130, a display 2140, a sensor 2150, a communicator 2160, an input/output interface 2170, a battery 2180, and a driver 2190. However, such components are only examples, and new components may be added to such components or some of such components may be omitted in practicing the disclosure.

The memory 2110 may be implemented by a nonvolatile memory, a volatile memory, a flash memory, a hard disk drive (HDD), a solid state drive (SSD), or the like. The memory 2110 may be accessed by the processor 2130, and reading, recording, correction, deletion, update, and the like, of data in the memory 2110 may be performed by the processor 2130. In addition, programs, data and the like, for configuring various screens to be displayed on a display region of a display may be stored in the memory 2110.

The processor 2130 may be electrically connected to the memory 2110 and control an overall operation and functions of the robot 2100. The processor 2130 controls an overall operation of the robot 2100. To this end, the processor 2130 may include one or more of a central processing unit (CPU), an application processor (AP), and a communication processor (CP). The processor 2130 may be implemented in various manners. For example, the processor 2130 may be implemented by at least one of an application specific integrated circuit (ASIC), an embedded processor, a microprocessor, a hardware control logic, a hardware finite state machine (FSM), or a digital signal processor (DSP). Meanwhile, in the disclosure, the term "processor" 2130 may be used as the meaning including a central processing unit (CPU), a graphic processing unit (GPU), a main processing unit (MPU), and the like.

The memory 2110, the camera 2120, and the processor 2130 have been described in detail with reference to FIG. 1, and thus, the rest of the components will be described below.

The display 2140 may display various information under the control of the processor 2130. Further, the display 2140 may be implemented by various types of displays such as a liquid crystal display (LCD) panel, a light emitting diode (LED), an organic light emitting diode (OLED), a liquid crystal on silicon (LCoS), and a digital light processing (DLP). In addition, a driving circuit, a backlight unit, and the like, that may be implemented in a form such as an a-si thin film transistor (TFT), a low temperature poly silicon (LTPS) TFT, an organic TFT (OTFT), and the like, may be included in the display 2140.

According to an embodiment, the display 2140 may be implemented as a touch screen in combination with a touch sensor.

According to an embodiment, the display 2140 may display various user interfaces (UIs) and icons.

According to an embodiment, the display 2140 may display text corresponding to a voice command of a user.

According to an embodiment, based on an object corresponding to a gaze direction of a user being identified, the display 2140 may display a UI asking whether the identified object is correct.

According to an embodiment, the display 2140 may provide a map on which an object corresponding to a gaze direction of a user is displayed.

The sensor 2150 may include various sensors necessary for the operation of the robot 2100. For example, the sensor 2150 may include a vision sensor, a distance sensor, a LiDAR sensor, a geomagnetic sensor, and the like. However, embodiments of the disclosure are not limited thereto, and the robot 2100 may further include various sensors for detecting positions of an object and the robot 2100.

The vision sensor is a sensor for identifying a region corresponding to the head of a user in an image captured by the camera 2120. According to an embodiment, the vision sensor may be implemented by an RGB sensor or an RGB-D sensor.

The distance sensor is a component for acquiring information on a distance from the robot 2100 to an object, and the distance sensor may be implemented by an infrared ray sensor, an ultrasonic sensor, a radio frequency (RF) sensor, or the like, and may be provided inside or outside of the robot 2100.

The LiDAR sensor is a sensor that may acquire information regarding a physical characteristic related to a target object (a position and direction of the robot 2100, a distance and directional relation between the robot 2100 and the target object, a shape and movement speed of the target object, or the like) by using a time required for an emitted laser pulse to be scattered or reflected by a target device and return, and changes in intensity, frequency, and polarization state of the scattered or reflected laser.

Specifically, the robot 2100 may acquire a LiDAR map by scanning the periphery of the robot 2100 using the LiDAR sensor. The LiDAR map is a map that may be acquired using information regarding the physical characteristic of the robot 2100 acquired using the laser pulse of the LiDAR sensor. In addition, the robot 2100 may acquire information regarding the position of the robot 2100 on the LiDAR map and position information corresponding to at least one object on the LiDAR map by performing SLAM using the LiDAR sensor.

The geomagnetic sensor is a sensor for detecting a geomagnetic field value, and information regarding a geomagnetic field direction around the geomagnetic sensor and information regarding a magnitude of a geomagnetic field may be acquired using the geomagnetic sensor.

The communicator 2160 may perform communication with an external device and an external server using various communication manners. Communication connection of the communicator 2160 with an external device and an external server may include communication through a third device (for example, a relay, a hub, an access point, or a gateway).

Meanwhile, the communicator 2160 may include various communication modules to perform communication with an external device. As an example, the communicator 2160 may include a wireless communication module, for example, a cellular communication module that uses at least one of long-term evolution (LTE), LTE Advance (LTE-A), code division multiple access (CDMA), wideband CDMA (WCDMA), universal mobile telecommunications system (UMTS), wireless broadband (WiBro), or global system for mobile communications (GSM). As another example, the wireless communication module may use at least one of, for example, wireless fidelity (WiFi), Bluetooth, Bluetooth low energy (BLE), or Zigbee.

According to an embodiment, the processor 2130 may receive a LiDAR map or a geomagnetic map corresponding to an environment in which the robot 2100 is operated from an external device or an external server through the communicator 2160 and store the received LiDAR map or geomagnetic map in the memory 2110.

The input/output interface 2170 is a component for receiving an audio signal from the outside and outputting audio data to the outside. Specifically, the input/output interface 2170 may include a microphone for receiving an audio signal from the outside and an audio outputter for outputting audio data to the outside.

The microphone may receive an audio signal from the outside, and the audio signal may include a voice command of a user. The audio outputter may output audio data under the control of the processor 2130. According to an embodiment, the audio outputter may output audio data corresponding to a voice command of a user. The audio outputter may be implemented by a speaker output terminal, a headphone output terminal, and an S/PDIF output terminal.

The battery 2180 is a component for supply power to the robot 2100, and the battery 2180 may be charged by a charging station. According to an embodiment, the battery 2180 may include a reception resonator for wireless charging. According to an embodiment, a charging method of the battery 2180 may be a constant current constant voltage (CCCV) charging method in which the battery 2180 is rapidly charged to a predetermined capacity by using a constant current (CC) charging method, and then, the battery 2180 is charged to full capacity by using a constant voltage (CV) method. However, the charging method is not limited thereto and the battery 2180 may be charged in various ways.

The driver 2190 is a component for moving the robot 2100 under the control of the processor 2130, and may include a motor and a plurality of wheels. Specifically, the driver 2190 may change a moving direction and a moving speed of the robot 2100 under the control of the processor 2130. Further, the driver 2190 may further include a motor capable of rotating the robot 2100.

Because the disclosure may be variously modified and have several embodiments, specific embodiments have been illustrated in the drawings and have been described in detail in a detailed description. However, it is to be understood that the disclosure is not limited to specific embodiments, but include various modifications, equivalents, and/or alternatives according to embodiments of the disclosure. Throughout the accompanying drawings, similar components will be denoted by similar reference numerals.

In describing the disclosure, when it is determined that a detailed description for the known functions or configurations related to the disclosure may unnecessarily obscure the gist of the disclosure, the detailed description therefor will be omitted.

In addition, the embodiments described above may be modified in several different forms, and the scope and spirit of the disclosure are not limited to the embodiments described above. Rather, these embodiments make the disclosure thorough and complete, and are provided to completely transfer the disclosure to those skilled in the art.

Terms used in the disclosure are used only to describe specific embodiments rather than limiting the scope of the disclosure. Singular forms are intended to include plural forms unless the context clearly indicates otherwise.

In the disclosure, an expression "have", "may have", "include", or "may include" indicates existence of a corresponding feature (for example, a numerical value, a function, an operation, or a component such as a part), and does not exclude existence of an additional feature.

In the disclosure, an expression "A or B", "at least one of A and/or B", or "one or more of A and/or B", may include all possible combinations of items enumerated together. For example, "A or B", "at least one of A and B", or "at least one of A or B" may indicate all of 1) a case where at least one A is included, 2) a case where at least one B is included, or 3) a case where both of at least one A and at least one B are included.

Expressions "first" or "second" used in the disclosure may indicate various components regardless of a sequence and/or importance of the components, will be used only to distinguish one component from the other components, and do not limit the corresponding components.

When it is mentioned that any component (for example, a first component) is (operatively or communicatively) coupled to or is connected to another component (for example, a second component), it is to be understood that any component is directly coupled to another component or may be coupled to another component through the other component (for example, a third component).

On the other hand, when it is mentioned that any component (for example, a first component) is "directly coupled" or "directly connected" to another component (for example, a second component), it is to be understood that the other component (for example, a third component) is not present between any component and another component.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware.

Instead, in some situations, an expression "apparatus configured to" may mean that the apparatus may "do" together with other apparatuses or components. For example, a phrase "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

In embodiments, a "module" or a "-er/or" may perform at least one function or operation, and be implemented by hardware or software or be implemented by a combination of hardware and software. In addition, a plurality of "modules" or a plurality of "-ers/ors" may be integrated in at least one module and be implemented by at least one processor except for a "module" or an "-er/or" that needs to be implemented by specific hardware.

Various elements and regions in the drawings are schematically illustrated. However, the disclosure is not limited by relative sizes or intervals illustrated in the accompanying drawings.

The diverse embodiments described above may be implemented in a computer or a computer-readable recording medium using software, hardware, or a combination of software and hardware. According to a hardware implementation, embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described in the specification may be implemented as the processor itself. According to a software implementation, embodiments such as procedures and functions described in the specification may be implemented as separate software modules. Each of the software modules may perform one or more functions and operations described in the specification.

The methods according to the diverse embodiments of the disclosure described above may be stored in a non-transitory readable medium. The non-transitory readable medium may be mounted and used in various devices.

The non-transitory computer readable medium is not a medium that stores data for a while, such as a register, a cache, a memory, or the like, but means a medium that semi-permanently stores data and is readable by an apparatus. In detail, programs for performing the diverse methods described above may be stored and provided in the non-transitory readable medium such as a compact disc (CD), a digital versatile disc (DVD), a hard disc, a Blu-ray disc, a universal serial bus (USB), a memory card, a read only memory (ROM), or the like.

According to an embodiment, the method according to the diverse embodiments disclosed in the disclosure may be included and provided in a computer program product. The computer program product may be traded as a product between a seller and a purchaser. The computer program product may be distributed in the form of a storage medium (e.g., a compact disc read only memory (CD-ROM)) that may be read by the machine or online through an application store (e.g., PlayStore™). In case of the online distribution, at least portions of the computer program product may be at least temporarily stored in a storage medium such as a memory of a server of a manufacturer, a server of an application store, or a relay server or be temporarily created.

In addition, although embodiments of the disclosure have been illustrated and described hereinabove, the disclosure is not limited to the specific embodiments described above, but may be variously modified by those skilled in the art to which the disclosure pertains without departing from the gist of the disclosure as disclosed in the accompanying claims. These modifications are to be understood to fall within the scope and spirit of the disclosure.

What is claimed is:

1. A control method of a robot, the control method comprising:

acquiring, through a camera of the robot, an image of a user;

acquiring, by analyzing the image, first information regarding a position of the user relative to a position of the robot and a gaze direction of the user relative to the position of the robot;

acquiring, based on an image capturing position of the robot at a point in time when the image is acquired and an image capturing direction of the camera at the point in time when the image is acquired, matching information for matching the first information with a map corresponding to an environment in which the robot is operated;

acquiring, based on the matching information and the first information, second information regarding the position of the user on the map and the gaze direction of the user on the map;

acquiring input data by mapping the second information on a grid map corresponding to the map;

identifying an object corresponding to the gaze direction of the user on the map, from among one or more objects in the environment in which the robot is operated, by inputting the input data into an artificial intelligence model trained to identify an object on the map; and based on a command from the user, causing the robot to perform an action related to the identified object or provide an output related to the identified object, wherein the acquiring the input data comprises:

identifying coordinates of first cells on the grid map, wherein an angle between the gaze direction of the user and each of the first cells on the grid map is equal to or less than a predetermined angle, and generating the input data based on the identified coordinates of the first cells.

2. The control method of claim 1, wherein the acquiring the first information further comprises:

identifying a region of the image corresponding to a head of the user;

identifying the position of the user based on the identified region; and identifying the gaze direction based on a-head pose of the head within the identified region.

3. The control method of claim 1, wherein the acquiring the matching information comprises identifying information regarding a position and a direction of the robot on the map at a point in time when the image is acquired by using a simultaneous localization and mapping (SLAM) method.

4. The control method of claim 1, wherein the identifying the object further comprises:

identifying coordinates corresponding to a position of the object on the grid map by inputting the input data to the artificial intelligence model; and identifying the object corresponding to the gaze direction of the user on the map based on the identified coordinates.

5. The control method of claim 4, wherein the artificial intelligence model is trained by using, as input data, binary data mapped onto the grid map, wherein the binary data corresponds to a path from a set of training coordinates on the grid map toward the position of the object on the grid map.

6. The control method of claim 4, wherein the artificial intelligence model is trained by using, as input data, data acquired based on the image of the user gazing at the object in the environment in which the robot is operated.

7. The control method of claim 1, further comprising:

based on the object being identified, performing rotation of at least a portion of the robot to include the object within a viewing angle of the camera;

based on a hand of the user being included in the viewing angle of the camera during the rotation, identifying a direction information corresponding with a position of the hand;

acquiring a third information obtained by updating information regarding the gaze direction of the user included in the second information based on the direction information corresponding to the position of the hand; and identifying the object corresponding to a gaze of the user on the map by applying the third information to the artificial intelligence model.

8. The control method of claim 1, wherein the causing the robot to perform the action related to the identified object comprises at least one of causing the robot to move relative to the location of the object and causing the robot to interact with the identified object.

9. The control method of claim 1, wherein the object is not included in the image.

10. A robot comprising:

a memory configured to store at least one instruction;

a camera configured to capture an image of a user; and at least one processor connected to the memory and the camera and configured to execute the at least one instruction, wherein the at least one instruction, when executed by the at least one processor, causes the robot to:

acquire an image of the user captured by the camera, acquire, by analyzing the image of the user, first information regarding a position of the user relative to a position of the robot and a gaze direction of the user relative to the position of the robot, acquire, based on an image capturing position of the robot at a point in time when the image is acquired and an image capturing direction of the camera at the point in time when the image is acquired, matching information for matching the first information with a map corresponding to an environment in which the robot is operated, acquire, based on the matching information and the first information, second information regarding the position and the gaze direction of the user on the map, acquire input data by mapping the second information on a grid map corresponding to the map, identify an object corresponding to the gaze direction of the user on the map, from among one or more objects in the environment in which the robot is operated, by inputting the input data to an artificial intelligence model trained to identify an object on the map, and based on a command from the user, perform an action or provide an output related to the identified object, and wherein the at least one instruction, when executed by the at least one processor, causes the robot to:

identify coordinates of first cells on the grid map, wherein an angle between the gaze direction of the user and each of the first cells on the grid map is equal to or less than a predetermined angle, and generate the input data based on the identified coordinates of the first cells.

11. The robot of claim 10, wherein the at least one instruction, when executed by the at least one processor, causes the robot to:

identify a region of the image corresponding to a head of the user, identify the position of the user based on the identified region, and identify the gaze direction of the user based on a pose of the head within the identified region.

12. The robot of claim 10, wherein the at least one instruction, when executed by the at least one processor, causes the robot to acquire the matching information by identifying information regarding a position and a direction of the robot on the map when capturing the image by using a simultaneous localization and mapping (SLAM) method.

13. The robot of claim 10, wherein the at least one instruction, when executed by the at least one processor, causes the robot to:

identify coordinates corresponding to a position of the object on the grid map by inputting the input data to the artificial intelligence model, and identify the object corresponding to the gaze direction of the user on the map based on the identified coordinates.

14. The robot of claim 13, wherein the artificial intelligence model is trained by using, as input data, binary data mapped onto the grid map, wherein the binary data corresponds to a path from a set of training coordinates on the grid map toward the position of the object on the grid map.

15. The robot of claim 13, wherein the artificial intelligence model is trained by using, as input data, data acquired based on the image of the user gazing at the object in the environment in which the robot is operated.

16. The robot of claim 10, wherein the at least one instruction, when executed by the at least one processor, causes the robot to:

perform the action related to the identified object by causing the robot to perform at least one of moving relative to the location of the object and physically interacting with the identified object.

17. The robot of claim 10, further comprising a display, wherein the at least one instruction, when executed by the at least one processor, causes the robot to:

display, on the display, a user interface inquiring whether the identified object was correctly identified.

18. The control method of claim 1, wherein the causing the robot to provide the output related to the identified object comprises displaying, on a display of the robot, a user interface inquiring whether the identified object was correctly identified.

* * * * *